（12）United States Patent
Sjöberg

(10) Patent No.: US 7,863,848 B2
(45) Date of Patent: Jan. 4, 2011

(54) INDUSTRIAL ROBOT SYSTEM

(75) Inventor: Ralph Sjöberg, Västerås (SE)

(73) Assignee: ABB AB, Västerås (SE)

( * ) Notice: Subject to any disclaimer, the term of this patent is extended or adjusted under 35 U.S.C. 154(b) by 501 days.

(21) Appl. No.: 11/921,451

(22) PCT Filed: May 11, 2006

(86) PCT No.: PCT/EP2006/062258

§ 371 (c)(1),
(2), (4) Date: Dec. 3, 2007

(87) PCT Pub. No.: WO2006/128784

PCT Pub. Date: Dec. 7, 2006

(65) Prior Publication Data

US 2009/0128079 A1    May 21, 2009

(51) Int. Cl.
*B25J 9/18* (2006.01)
(52) U.S. Cl. ............. 318/568.11; 318/563; 318/568.13; 318/568.16
(58) Field of Classification Search ............... 318/568.1, 318/568.11, 568.13, 568.16, 563; 700/80, 700/85, 245, 248, 249, 258, 264
See application file for complete search history.

(56) References Cited

U.S. PATENT DOCUMENTS

| | | | | |
|---|---|---|---|---|
| 5,459,382 A | * | 10/1995 | Jacobus et al. | 318/568.11 |
| 6,104,158 A | * | 8/2000 | Jacobus et al. | 318/568.11 |
| 6,560,513 B2 | * | 5/2003 | Krause et al. | 700/264 |
| 2004/0260426 A1 | * | 12/2004 | Johannessen et al. | 700/245 |

FOREIGN PATENT DOCUMENTS

| | | |
|---|---|---|
| EP | 1479964 A | 11/2004 |
| EP | 1535706 A | 6/2005 |
| JP | 2004017223 A | 12/2003 |
| JP | 2004017223 A * | 1/2004 |
| WO | WO-03/036324 A | 5/2003 |

OTHER PUBLICATIONS

PCT/ISA/210—International Search Report—Jan. 29, 2007.
PCT/ISA/237—Written Opinion of the International Searching Authority—Jan. 29, 2007.

* cited by examiner

*Primary Examiner*—Walter Benson
*Assistant Examiner*—Thai Dinh
(74) *Attorney, Agent, or Firm*—Venable LLP; Eric J. Franklin

(57) ABSTRACT

An industrial robot system including at least one industrial robot including at least one manipulator located in a robot cell, a control unit for controlling the manipulator, a portable operator control device for teaching and manually operating the manipulator, a detecting unit detecting when the portable operator control device leaves the robot cell, and a warning generator producing a warning to the operator upon detecting that the portable operator control device leaves the robot cell.

27 Claims, 5 Drawing Sheets

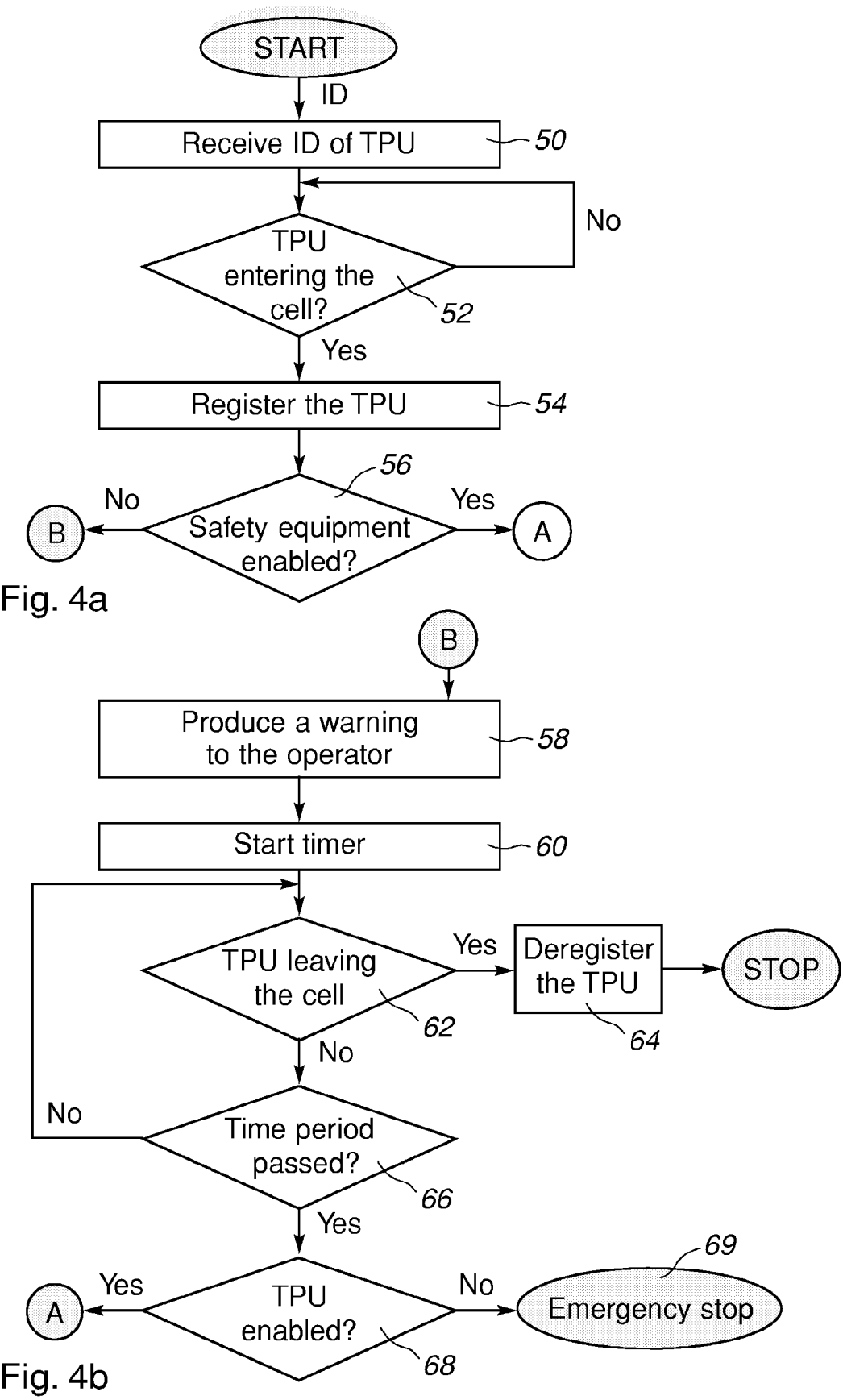

INDUSTRIAL ROBOT SYSTEM

FIELD OF THE INVENTION

The present invention relates to an industrial robot system comprising one industrial robot comprising at least one manipulator, a control unit for controlling the manipulator, and a portable operator control device (TPU) wirelessly connected to the control unit. The invention also relates to a method for securing the safety in such industrial robot system.

PRIOR ART

An industrial robot is programmed to carry out work along an operating path. In order to program or teach the robot the work, the robot is manipulated to positions along the desired operating path. These positions are stored as instructions in a memory in the control unit. During operation of the robot, the program instructions are executed, thereby making the robot operate as desired.

The person controlling a robot is denoted an operator. In the following the words user and operator are used synonymously. An industrial robot can be operated in different operation modes. For example, when the robot is put in manual operation mode, the robot is controlled by means of a portable operator control device, generally denoted a Teach Pendant Unit, and called hereafter a TPU. The TPU is used for manually controlling the robot, for example to teach or program the robot to follow an operating path. The TPU may also be used for monitoring the robot program, changing certain variables in the program, starting, stopping and editing the program. When the robot is switched to automatic mode, the control unit controls the robot.

A TPU comprises operator control means, for example a joystick, a ball, a set of buttons or any combination thereof, a visual display unit, and safety equipment for protecting a user against injury during manual control of the robot, such as an enabling device and a stop device, for example an emergency stop button, or a conditional stop button. The enabling device is for example a switch or a push button, which has to be pressed by the operator to enable control of the robot by the TPU. For safety reasons the TPU normally is provided with either an emergency stop button, which makes it possible for the operator to unconditionally stop the robot at any time by pushing the button, or a conditional stop button, which makes it possible for the operator to conditionally stop the robot.

For security reasons the manipulator is often placed into a robot cell. The robot cell is usually an enclosed area, for example the robot cell is enclosed by a fence having a gate.

In a robot system comprising a plurality of robots it is advantageous to use a wireless TPU. The international patent application WO03036324 discloses an industrial robot system comprising industrial robots being controlled by a wireless TPU. The TPU communicates with the robot control system via a data link. The document discloses that one or more areas are defined within which the TPU is allowed to, under secure condition, establish communication with the control system via the data link. When a TPU is moved away from the robot and reaches outside the defined area, the system is programmed to automatically break the data link between the control unit and the TPU. The data link is established again when the TPU is back again within the defined area.

When a TPU has been connected to a network and communication have been established between the TPU and the control system of the selected robot, the TPU has to be coupled to the robot. To couple the TPU to the robot includes connect the TPU to the safety system of the robot, and login the operator to the control system of the robot. To connect the TPU to the safety system of the robot includes activating the enabling function of the robot, which means to put the enabling device of the TPU into function for the robot. Thus, when the enabling function is activated, the enabling device of the TPU is enabled and it is possible to move the robot, for example by means of the joystick, when the enabling button of the TPU is pressed.

To connect the TPU to the safety system of the robot also includes activating the emergency stop function of the robot, which for example means to put the emergency stop button of the TPU into function for the robot. When the emergency stop function of the TPU is activated, the emergency stop button of the TPU is enabled and it is possible to emergency stop the robot by pushing the emergency stop button. If the emergency stop function of the TPU is deactivated the emergency stop button of the TPU is disabled and nothing happens when the emergency stop button is pressed.

When the operator no longer desires to control the robot, he has to disconnect the TPU from the control unit of the robot by sending a logout order from the TPU to the control unit. The logout order logs out the operator from the control unit and deactivates the safety function of the TPU, which means that the safety equipment of the TPU is disabled. To avoid accidents and unintended emergency stops of the robot, the safety equipment of the TPU should be out of function as long as the wireless TPU is outside the robot cell.

OBJECTS AND SUMMARY OF THE INVENTION

The object of the present invention is to improve safety in an industrial robot system.

According to the invention the system comprises a detecting unit detecting when the TPU leaves the robot cell, and a warning generator producing a warning to the operator upon detecting that the TPU is leaving the robot cell, in order to draw the operator's attention to the fact that the TPU is leaving the cell. The warning is for example audible, visible or tactile. The warning is for example a message displayed on the display unit of the TPU.

In this context a robot cell is a defined safe area surrounding the manipulator. Within the robot cell certain safety rules are applied. One safety rule is for example that the safety equipment of the TPU must function within the robot cell. For safety reasons the robot cell should at least cover the working range of the robot. The boundary line of the robot cell is marked out in some way, for example by a visible marking line in the floor or by a fence.

The invention draws the operator's attention to the fact that the TPU is leaving the robot cell. When the operator leaves the robot cell he should disable the safety equipment of the TPU as soon as possible, and then for example switch the robot back to automatic mode. Leaving the robot cell with enabled safety equipment means that the TPU still controls the movements of the robot. This could lead to unintentional moves or stops of the robots and should be avoided.

The invention is particularly suitable for a TPU adapted for wireless communication with the control unit. A robot system having a wireless TPU comprises a safety function, which upon order enables and disables the safety equipment of the TPU. With a wireless TPU it is easy to forget to disable the safety equipment and to move away a large distance from the robot cell with the safety equipment enabled.

According to one embodiment of the invention, for simplicity, a warning is generated each time the operator leaves the cell.

According to another embodiment of the invention the warning generator is adapted to produce said warning upon detecting that the TPU leaves the cell and that the safety equipment is enabled. For example, the system may comprise a timer which starts running upon detecting that the TPU leaves the robot cell, and a check module checking whether or not the safety equipment of the TPU is still enabled a certain time period after the point in time when the TPU has left the robot cell, and the robot system is adapted to generate a warning if the safety equipment is still enabled at that point in time. Thus, the operator is only warned if he forgets to disable the safety equipment.

According to one embodiment of the invention the system further comprises a timer which starts running upon detecting that the TPU leaves the robot cell, and a check module checking whether or not the safety equipment of the TPU is still enabled a certain time period after the point in time when the TPU leaves the robot cell. The robot system is adapted to automatically emergency stop the robot if the safety equipment is still enabled said time period after the point in time when the TPU leaves the robot cell. As a first security step, the operator is warned about the fact that he is leaving the robot cell with a TPU having enabled safety equipment. Then, the operator has a certain time period at his disposal to order disabling of the safety equipment. If the safety equipment is still not disabled when this time period has passed, the robot is emergency stopped as a second security step. This embodiment prevents the operator from by mistake leaving the robot cell without disabling the safety equipment of the TPU, and thus improves the safety of the robot system.

According to one embodiment of the invention the system further comprises: a detecting unit detecting when the TPU enters the robot cell with the safety equipment disabled, and a warning generator producing a warning to the operator upon detecting that the TPU enters the robot cell and the safety equipment is disabled. The invention draws the operator's attention to the fact that he is entering the robot cell with a TPU having disabled safety equipment. Entering the robot cell with a TPU having disenabled safety equipment is dangerous and should be avoided. This embodiment further improves the safety of the robot system.

According to one embodiment of the invention the system comprises a timer which starts running upon detecting that the TPU enters the robot cell with disabled safety equipment, and a check module checking whether or not the TPU is still in the robot cell and the safety equipment of the TPU is still disabled a certain time period after the point in time when the TPU entered the robot cell. The robot system is adapted to automatically emergency stop the robot if the TPU is still in the robot cell and the safety equipment is still disabled said time period after the point in time when the TPU entered the robot cell. As a first security first step, the operator is warned about the fact that he is entering the robot cell with a TPU having disabled safety equipment. Then the operator has a certain time period at his disposal to order enabling of the safety equipment. As a second security first step, if the safety equipment is not enabled within this time period and the TPU is still within the robot cell, the robot is emergency stopped. This embodiment prevents the operator from by mistake entering the robot cell without enabling the safety equipment of the TPU, and thus improves the safety of the robot system.

According to one embodiment of the invention the system further comprises an identifying unit identifying the TPU upon entering and leaving the robot cell. Each TPU is provided with a unique ID (identification), for example a unique identification number or mark, and the identifying unit is adapted to read the ID of the TPU. This embodiment makes it possible for the control unit to identify which TPU is entering the robot cell and to carry out a safety check based on the identity of the TPU. For example, the safety check includes checking whether on not the TPU is authorized to be used in the robot cell.

According to one embodiment of the invention the system comprises a registration unit registering the TPU upon entering the robot cell and deregistering the TPU upon leaving the robot cell. Thanks to the identifying unit and the registration unit it is possible to know if a certain TPU is located inside or outside of the cell. This embodiment is advantageous in a robot system including a plurality of TPUs, and makes it possible for the system to keep track on which of the TPUs are in the cell and which are outside the cell.

According to one embodiment of the invention the system comprises means for checking whether or not the TPU is coupled to the control unit of any manipulator located in the robot cell upon detecting that the TPU is entering the robot cell, and the robot system is adapted to emergency stop the robot upon detecting that a TPU, which is not coupled to the control unit of any manipulator located in the robot cell, is entering the cell. This embodiment prevents a TPU, which do not belong to the robot cell from entering the cell. For instance, a TPU coupled to a robot in one robot cell is prevented from entering another robot cell. This embodiment is for example advantageous in a work place including a plurality of robot cells.

According to one embodiment of the invention the detecting unit is adapted to detect when someone, who is not carrying a TPU, is entering the robot cell and the robot system is adapted to emergency stop the robot upon detecting that someone without a TPU is entering the robot cell. To enter a robot cell without having a TPU with enabled safety equipment is dangerous. This embodiment further improves the safety of the robot system.

According to an embodiment of the invention the safety equipment comprises an enabling device, which upon activation enables manual operation of the robot by means of the TPU and/or a stop device, which upon activation emergency stops the robot. The stop device is for example an emergency stop button or a conditional stop button.

According to a further aspect of the invention, the object is achieved by a computer program directly loadable into the internal memory of a computer or a processor, comprising software code portions for performing the steps of the method according to the invention, when said program is run on a computer. The computer program is provided either on a computer readable medium or through a network.

According to another aspect of the invention, the object is achieved by a computer readable medium having a program recorded thereon, when the program is to make a computer perform the steps of the method according to the invention, and said program is run on the computer.

BRIEF DESCRIPTION OF THE DRAWINGS

The invention will now be explained more closely by the description of different embodiments of the invention and with reference to the appended figure.

FIG. 4a-c is a flow diagram showing a first embodiment of a method according to the invention.

DETAILED DESCRIPTION OF PREFERRED EMBODIMENTS OF THE INVENTION

Figure 1:
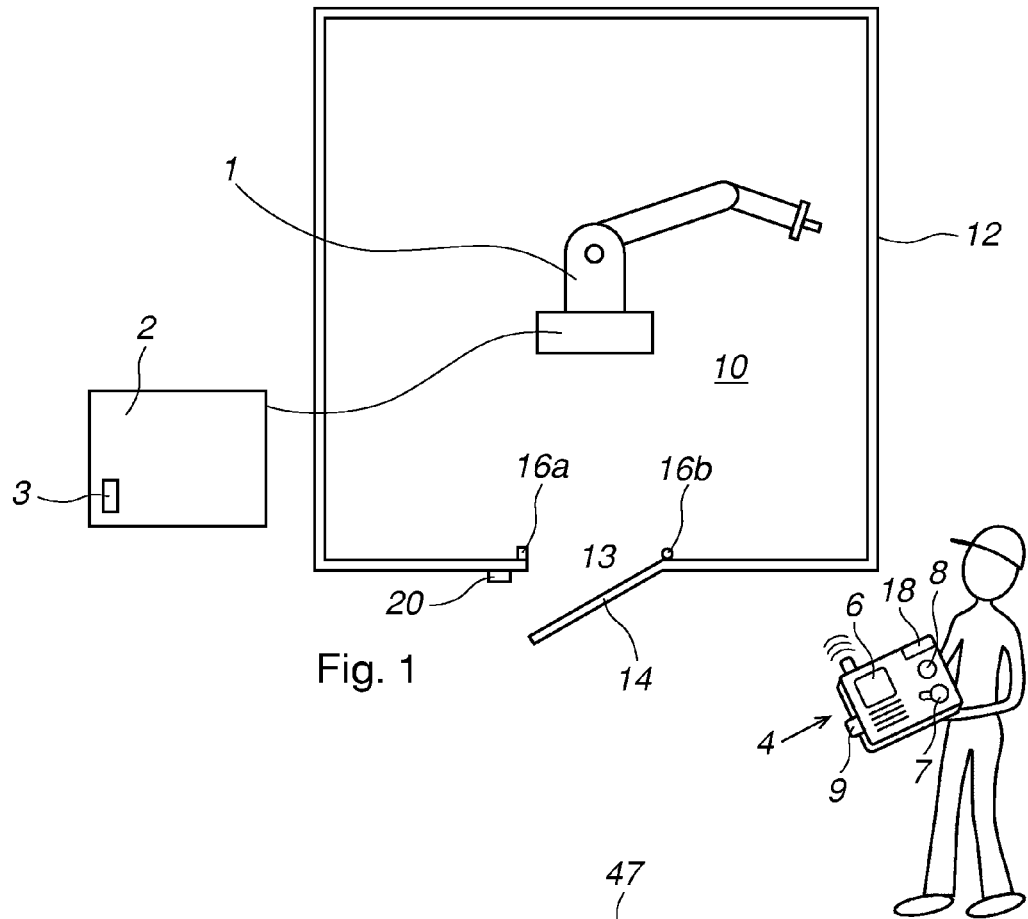
FIG. 1 shows an industrial robot system according to a first embodiment of the invention.

FIG. 1 shows an industrial robot system according to a first embodiment of the invention. The robot system comprises a manipulator 1, a control unit 2 for controlling the manipulator 2, and a portable operator control device 4, in the following denoted a TPU (Teach Pendant Unit) for teaching and manually operating the manipulator. The control unit 2 comprises a switch 3 for switching between automatic and manual mode. The TPU communicates with the control unit 3 via a data link, for example a wireless data link. The TPU comprises a display screen 6, function keys, a joystick 7, an emergency stop button 8, and an enabling device 9. The TPU also includes and antenna and a radio module for wireless communication with the control unit 2. The joystick 7 is used for controlling the movement of the manipulator when the robot is manually operated.

The enabling device 9 comprises a button 12, which has to be pressed by the operator to enable manual control of the robot by the TPU. When the operator releases the button of the enabling device 9, the robot can no longer be operated by the TPU. The emergency stop button 8 causes an emergency stop upon activation. The enabling device 9 and the emergency stop device 8 are parts of the safety equipment of the TPU. However, in other embodiments the safety equipment instead may comprise a conditional stop button, any other type of stop device, or only an enabling device.

The manipulator 1 is placed into an enclosed area 10 denoted a robot cell. In this embodiment the robot cell is enclosed by a fence 12 provided with an opening 13 having a gate 14 for entrance and exit of the robot cell. The operator has to enter and leave the robot cell through the opening 13.

The robot system comprises a detecting unit 16 detecting when the TPU enters and leaves the robot cell 10. The detecting unit detects the TPU either directly or indirectly, for example by detecting when the operator is entering or leaving the robot cell. In this embodiment the same detecting unit is used for detecting that the TPU is entering and leaving the cell. However, in another embodiment it is possible to use two different detecting units, one unit for detecting when the TPU leaves the cell, and another unit for detecting when the TPU enters the cell.

For example, the detecting unit is located on or in the close vicinity of the gate of the cell. Thus, it is easy to detect when the TPU enters and leaves the cell. In this embodiment the detecting unit 16 is arranged in connection to the entrance/exit opening of the robot cell. The detecting unit could be based on any suitable known detector technology, for example movement detector, IR (infrared radiation), GPS (global positioning system), image recognition, or a plate located in the floor detecting when the operator presses it. The detecting unit shown in FIG. 1 comprises a first part 16a producing a light beam across the opening 13 of the robot cell, and a second part 16b detecting when someone or something passes the gate and then blocks the light beam for a short moment. The detecting unit is connected to the control unit 2. When the detecting unit detects that someone is entering or leaving the cell, the detecting unit sends information about that to the control unit.

The industrial robot system further comprises an identifying unit identifying the TPU upon entering and leaving the robot cell. In this embodiment the TPU is provided with a unique marking 18, for example a barcode, and the identifying unit is a reader 20 reading the marking 20 on the TPU, for example a barcode reader. The reader 20 is located outside the cell and close to the opening 13. The operator must register the TPU before entering the cell by holding the marking 18 in front of the reader 20. In another embodiments of the invention the TPU sends a unique radio signal to an identifying unit, which identifies the TPU based on the unique radio signal. Any suitable know identifying technology can be used for identifying the TPU. Information about the identity of the TPU is sent to the control unit 2 of the robot.

Figure 2:
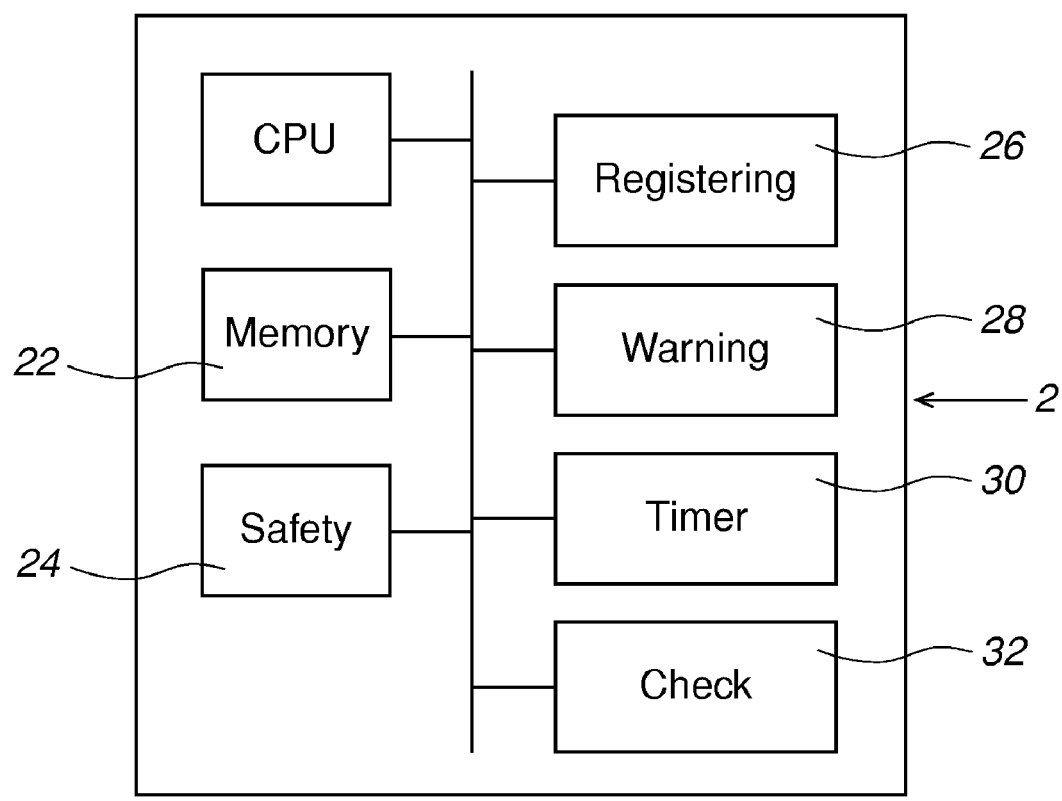
FIG. 2 shows a block scheme of a part of the control unit of the robot.

FIG. 2 shows a block scheme of the part of the control unit that is essential for the invention. The control unit 2 comprises suitable means for communication with the TPU and for receiving information from the detecting unit 16d and the identifying unit 20. The control unit comprises a CPU (central processing unit) and storage means 22 for storing software comprising program instructions for carrying out the invention.

The control unit 2 further comprises a safety function 24, which upon activation enables the safety equipment of the TPU and upon deactivation disables the safety equipment of the TPU. In this embodiment the safety function enables and disables the enabling device 9 and the emergency stop device 8 of the TPU. However in another embodiment the safety function may enable and disable either the enabling device or the emergency stop device. An order for activation of the safety function is sent to the control unit 2 during a procedure for coupling the TPU to the robot. To couple the TPU to the robot includes to connect the TPU to the safety function of the robot, and to login the operator to the control unit of the robot. In this embodiment the operator initiates the coupling of the TPU to the robot and thereby initiates the activation of the safety function. An order for deactivation of the safety function is sent to the control unit during a procedure for logout the TPU from the robot. In this embodiment the operator initiates the logout of the TPU from the robot and thereby initiates the deactivation of the safety function.

The safety function of the control unit comprises an enabling circuit, often denoted an enabling chain. The enabling circuit has to be activated before the operator is allowed to manually operate the robot by the TPU. When the safety function is activated, the safety equipment of the TPU is enabled, which means that the safety equipment is in working order and ready to be used. When the safety function is deactivated, the safety equipment of the TPU is disabled, which means that the safety equipment is not working and cannot be used. For safety reasons the operator should couple the TPU to the robot before entering the robot cell.

The control unit 2 further comprises a registration unit 26 registering the TPU upon entering the robot cell and deregistering the TPU upon leaving the robot cell. The registering unit stores the identity of the TPU or TPUs which is/are in the cell for the moment. Thus, the registering unit keeps track of which of the TPUs are inside the cell.

The control unit 2 further comprises a warning generator 28 producing a warning to the operator upon detecting that the TPU leaves the robot cell. In this embodiment, the warning generator 28 also produces a warning to the operator upon detecting that the TPU enters the robot cell with the safety equipment disabled. The warning could for example be a sound signal, such as a beep, a vibration of the TPU or a visible warning, such as a warning lamp. For example, the warning is a message displayed on the display device of the TPU. Upon leaving the cell, the message for example informs the operator about the fact that he is leaving the cell with the safety equipment of the TPU enabled. Upon entering the cell, the message for example informs the operator about the fact that he is entering the cell with the safety equipment of the TPU disabled. The warning generator 28 sends instructions to the TPU to display the warning message.

The control unit 2 further comprises a timer 30 which starts running upon detecting that the TPU enters the robot cell with disabled safety equipment, and a check module 32 checking whether or not the TPU is still in the robot cell and the safety equipment of the TPU is still disabled a certain time period after the point in time when the TPU entered the robot cell. The control unit emergency stops the robot if the TPU is still in the robot cell and the safety equipment is still disabled after the time period has passed.

The timer 30 also starts running upon detecting that the TPU leaves the robot cell. The check module 32 is also adapted to check if the safety equipment of the TPU is still enabled a certain time period after the point in time when the TPU has left the robot cell. The control unit emergency stops the robot if the safety equipment is still enabled when the time period has passed. The time period is determined based on safety considerations. The length of time period to wait after the point in time when the TPU has entered the robot cell may differ from the length of time period to wait after the point in time when the TPU has leaved the robot cell. Considering safety reasons, the length of time period to wait after the point in time when the TPU has leaved the robot cell is allowed to be longer than the length of the time period to wait after the point in time when the TPU has entered the robot cell.

Figure 3:
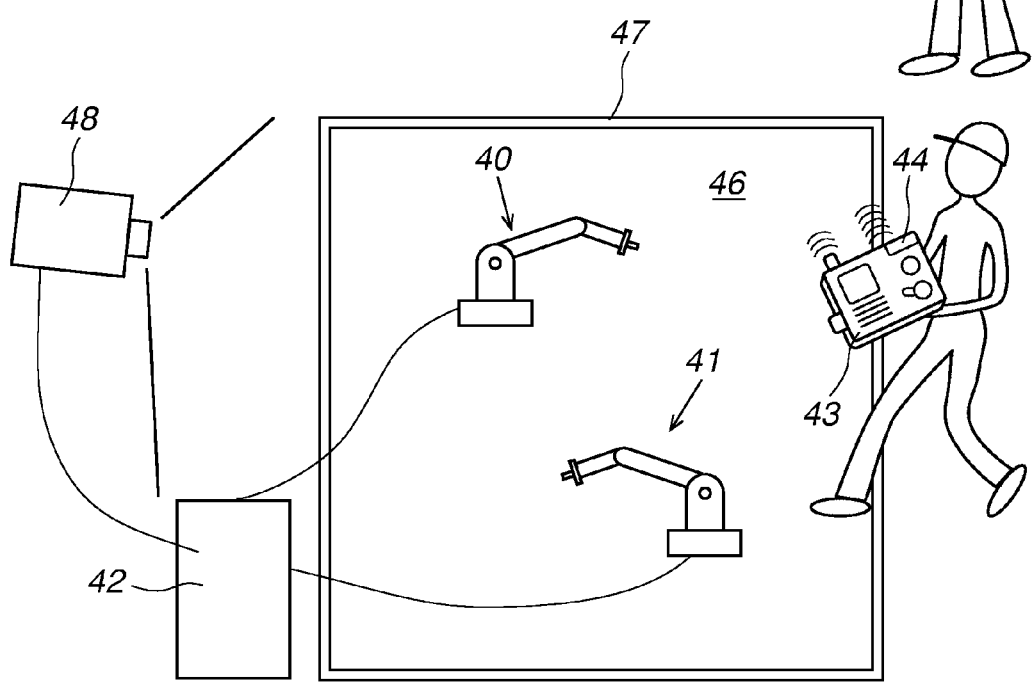
FIG. 3 shows an industrial robot system according to a second embodiment of the invention.

FIG. 3 shows an industrial robot system according to a second embodiment of the invention. Two manipulators 40 and 41 are connected to a control unit 42. The robot system comprises at least one TPU 43 for manual control of the manipulators. Each TPU has been given a unique ID (identity). Each TPU is provided with a signal generator generating a unique identifying signal representing its ID, and a transmitter 44 for transmitting the identifying signal. The control unit 42 comprises a receiver, receiving the identifying signal from the TPU. Thus, the control unit is informed about the identity of each TPU entering and leaving the robot cell. In the procedure for coupling the TPU to the control unit, information about the identity of the TPU is sent to the control unit. Thus, the control unit is informed about the identity of all TPU's coupled to the control unit.

The manipulators 40 and 44 are located in a robot cell 46. The boarder of the robot cell is marked with a visible line 47 on the floor. A camera 48 is mounted such that the whole area of the robot cell is in the view of the camera. The camera 48 is connected to the control unit 42. A continuous stream of images captured from the camera is sent to the control unit 42. The control unit comprises software for carrying out image recognition. The image recognition software is adapted to detect if a person is entering or leaving the robot cell, i.e. if a person is crossing the boarder line 47 to the cell, based on the received images from the camera. The image recognition software is also adapted to determine whether or not the person is carrying a TPU. If the image recognition software detects that a person without a TPU is trying to enter the cell, the control unit is adapted to immediately emergency stop the robot. If the image recognition software detects that a person carrying a TPU is entering the cell, and the identity of the TPU does not correspond to any TPU coupled to the control unit, the control unit is adapted to immediately emergency stop the robot. If a person is entering the cell with a disabled safety equipment a warning is produced in the same way as described with reference FIGS. 1 and 2, and if a person is leaving the cell with a enabled safety equipment a warning is produced in the same way as described with reference to FIGS. 1 and 2.

Figure 4C:
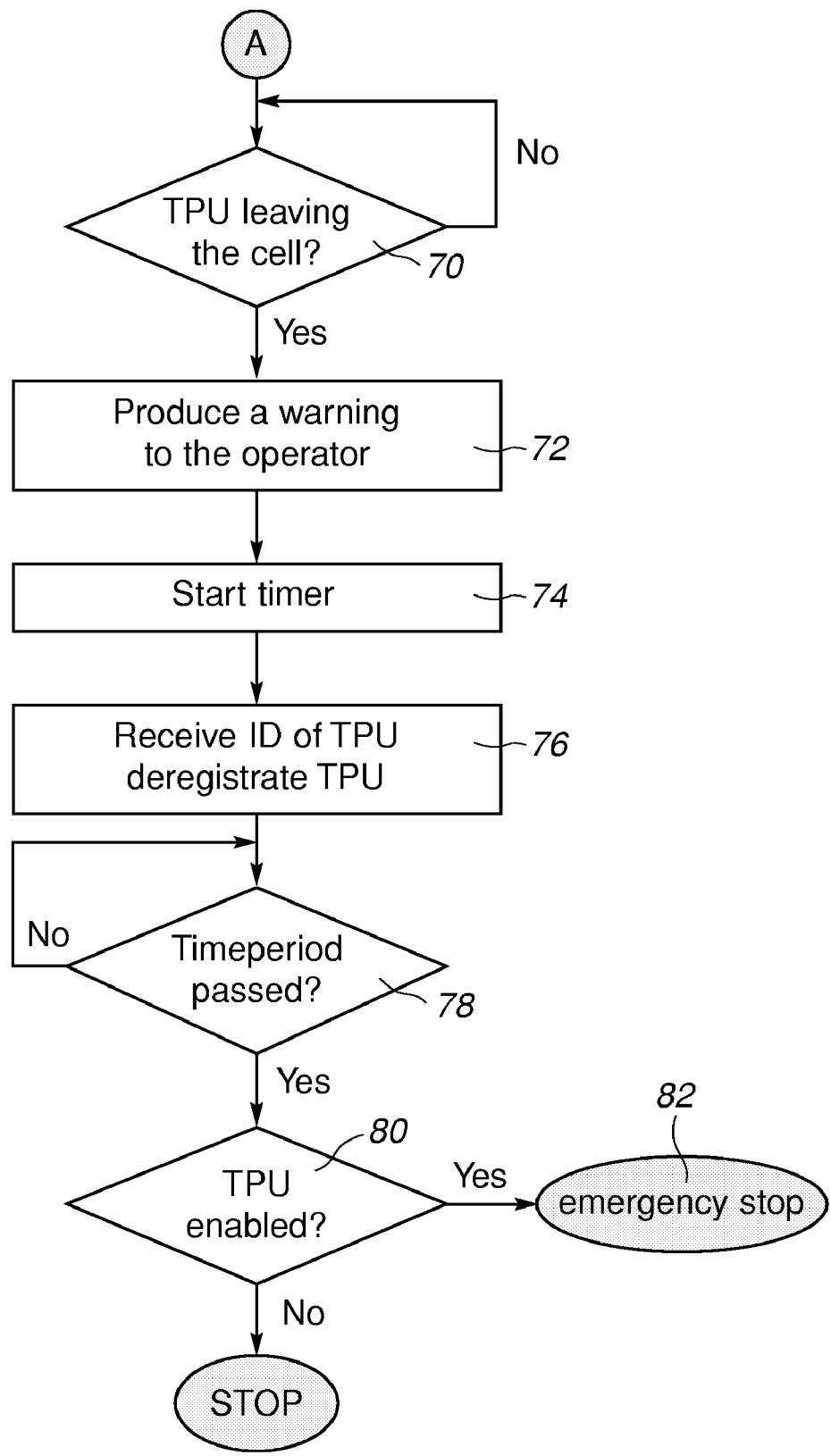

FIGS. 4*a-c* are flow diagrams illustrating a method and a computer program for securing safety in an industrial robot system, according to an embodiment of the present invention. It will be understood that each block of the flow diagram can be implemented by computer program instructions, which are executed by the central processing unit of the control unit. However, some of the instruction can also be executed by a central processing unit of the TPU, or by an external computer. The method is for example applicable in a robot system as illustrated in FIG. 1.

An operator carrying a TPU should identify the TPU before entering the cell, for example by holding the barcode 18 of the TPU close to the reader 20 outside the opening 13 to the cell. The control system receives the identity of the TPU, block 50. After identifying the TPU, the operator enters the cell through the opening 13. The detecting unit 16*a-b* detects that someone is entering the cell. The control unit receives informing about the fact that the TPU has entered the cell, block 52. The control unit registers the TPU, block 54, by adding the identity of the TPU to a register holding the identity of all TPU's inside the cell. The control unit checks if the safety equipment of the TPU is enabled or not, block 56. If the safety equipment is enabled continue from A in FIG. 4*c*, otherwise continue from B in FIG. 4*b*.

B, FIG. 4*b*: If the check reveals that the safety equipment is disabled a warning is produced to the operator, block 58. In this embodiment a message is displayed on the display screen on the TPU. The message says for example "Safety equipment not enabled, leave the cell immediately". At the same time as the operator enters the cell with a disabled the safety equipment the timer 30 is started, block 60. When the timer has started the operator has a certain timer period at his disposal to either leave the cell, or enable the safety equipment. If the operator leaves the cell during that time period the TPU is deregistered, i.e. the identity of the TPU is removed from the register holding the identity of all TPU's inside the cell, block 64. If the time period has passed, the TPU is still inside the cell, and the safety equipment is still disabled, block 66, 68, the control unit emergency stops robot, block 69. If the safety equipment is now enabled continue from A in FIG. 4*c*, block 68.

A, FIG. 4*c*: If the safety equipment is enabled and the TPU is inside the cell, wait until the detecting unit 16*a-b* detects that someone is leaving the cell. The control unit receives informing about the fact that the TPU has left the cell, block 70. Upon receiving this information, the control unit produces a warning to the operator, block 72. In this embodiment the warning is a message displayed on the display screen on the TPU. The message says for example "You are now leaving the cell. Disable the safety equipment immediately". At the same time as the operator leaves the cell the timer 30 is started, block 74. When the timer has started the operator has a certain timer period at his disposal to disable the safety equipment. The operator must also provide the identity of the TPU to the control unit, for example by holding the barcode 18 of the TPU close to the reader 20 outside the opening 13 to the cell. The control system receives the identity of the TPU, and the TPU is deregistered, i.e. the identity of the TPU is removed from the register holding the identity of all TPU's inside the cell, block 76. When the time period has passed, block 78, the control system checks if the safety equipment is still enabled, block 80. If the safety equipment is still enabled after the time period has passed, the control unit emergency stops robot, block 82.

Figure 5:
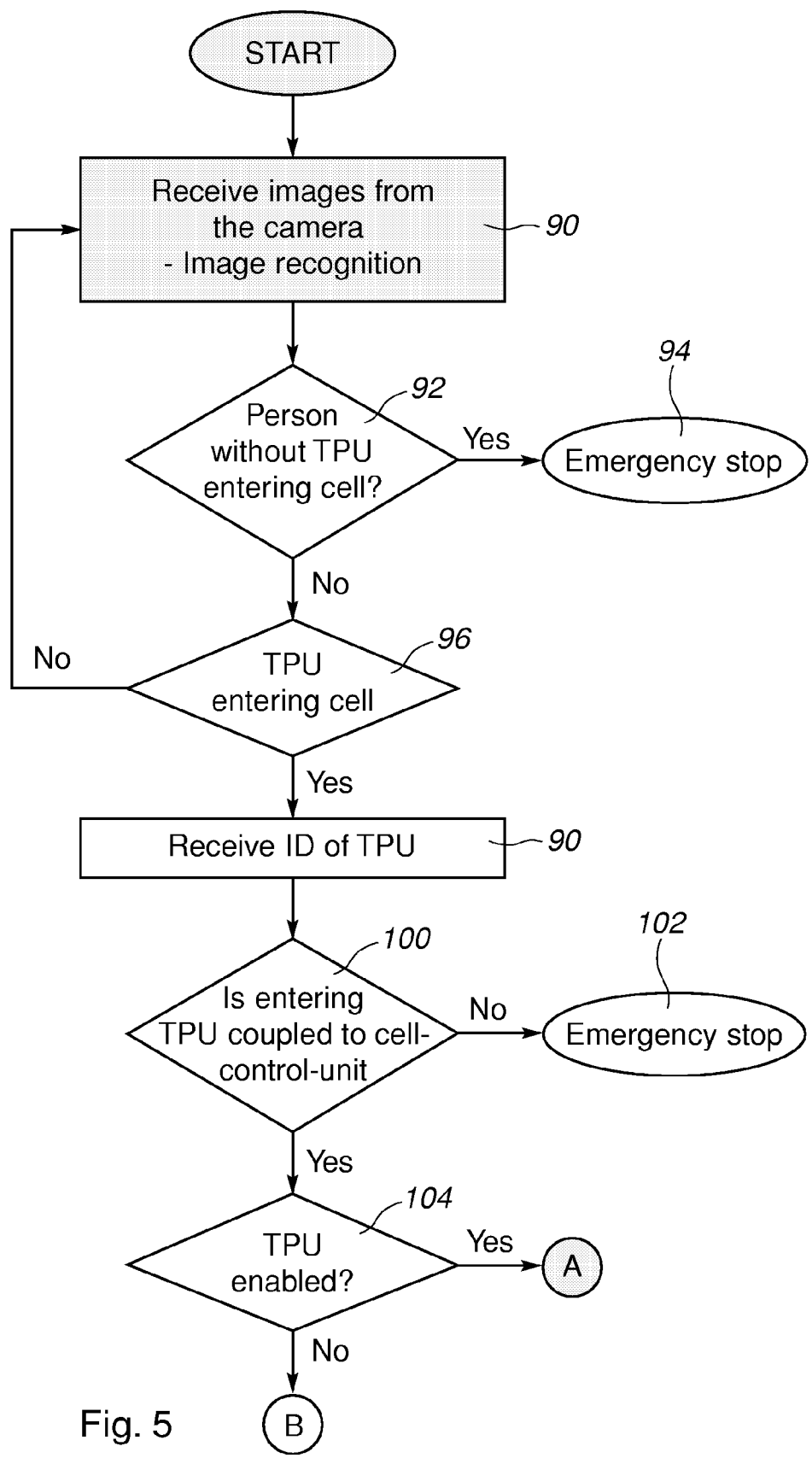
FIG. 5 is a flow diagram showing a second embodiment of a method according to the invention.

FIG. 5 is a flow diagram illustrating a method and a computer program for securing safety in an industrial robot system, according to a second embodiment of the invention. The method is for example applicable in a robot system as illustrated in FIG. 3.

The control unit 42 receives a continuous stream of images captured from the camera 48 and carries out image recognition on the images, block 90. The control unit detects if a person is entering the robot cell, and if the person is entering the cell without carrying any TPU, based on the received images from the camera by means of image recognition, block 92. If it is detected that a person without a TPU is trying to enter the cell, the control unit is adapted to immediately emergency stop the robot, block 94. If it is detected that someone carrying a TPU is entering the cell, block 96, the identity of the TPU is read, block 90. When the identity of the TPU is read it is checked if a TPU with this identity is coupled to the control unit of the cell, block 100. If the check reveals that the TPU is not coupled to the control unit, the control unit emergency stops the robot, block 102. If the TPU is coupled to the control unit it is checked if the safety equipment of the TPU is enabled or not, block 104. If the safety equipment is enabled continue from A in FIG. 4c, otherwise continue from B in FIG. 4b.

The present invention is not limited to the embodiments disclosed but may be varied and modified within the scope of the following claims. For example in another embodiment, the system only detects when the robot leaves the cell and produces a warning upon detecting when the TPU leaves the cell, and there is no detection, or any warning generated, when the TPU enters the cell.

The invention claimed is:

1. An industrial robot system, comprising:
   at least one industrial robot comprising at least one manipulator located in a robot cell,
   a control unit configured to control the at least one manipulator,
   a portable operator control device for manually operating the at least one manipulator,
   a detecting unit configured to detect when the portable operator control device leaves the robot cell,
   a warning generator configured to produce a warning to an operator upon detecting that the portable operator control device leaves the robot cell, in order to draw the operator's attention to the portable operator control device leaving the cell, and
   a safety function, which upon order enables and disables the safety equipment of the portable operator control device.

2. The industrial robot system according to claim 1, wherein said warning generator is adapted to produce the warning to the operator upon detecting that the portable operator control device leaves the cell and the safety equipment is enabled, in order to draw the operator's attention to the portable operator control device leaving the robot cell with the safety equipment enabled.

3. The industrial robot system according to claim 1, further comprising:
   a timer which starts running upon detecting that the portable operator control device leaves the robot cell, and
   a check module configured to check whether or not the safety equipment of the portable operator control device is still enabled a certain time period after the point in time when the portable operator control device has left the robot cell,
   wherein the robot system is adapted to automatically emergency stop the robot if the safety equipment is still enabled said time period after the point in time when the portable operator control device has left the robot cell.

4. The industrial robot system according to claim 1, further comprising:
   a detecting unit configured to detect when the portable operator control device enters the robot cell and the safety equipment is disabled, and
   a warning generator configured to produce a warning to the operator upon detecting that the portable operator control device enters the robot cell and the safety equipment is disabled.

5. The industrial robot system according to claim 4, further comprising:
   a timer which starts running upon detecting that the portable operator control device enters the robot cell with disabled safety equipment, and
   a check module configured to check whether or not the portable operator control device is still in the robot cell and the safety equipment of the portable operator control device is still disabled a certain time period after the point in time when the portable operator control device entered the robot cell,
   wherein the robot system is adapted to automatically emergency stop the robot if the portable operator control device is still in the robot cell and the safety equipment is still disabled said time period after the point in time when the portable operator control device entered the robot cell.

6. The industrial robot system according to claim 1, further comprising:
   an identifying unit configured to identify the portable operator control device upon entering and leaving the robot cell.

7. The industrial robot system according claim 6, further comprising:
   a registration unit configured to register the portable operator control device upon entering the robot cell and deregistering the portable operator control device upon leaving the robot cell.

8. The industrial robot system according to claim 6, further comprising:
   means for checking whether or not the portable operator control device is coupled to the control unit of any manipulator located in the robot cell upon detecting that the portable operator control device is entering the robot cell,
   wherein the robot system is adapted to emergency stop the robot upon detecting that a portable operator control device, which is not coupled to the control unit of any manipulator located in the robot cell, is entering the cell.

9. The industrial robot system according to claim 1, wherein the detecting unit is adapted to detect when someone without a portable operator control device is entering the robot cell and the robot system is adapted to emergency stop the robot upon detecting that someone without a portable operator control device is entering the robot cell.

10. The industrial robot system according to claim 1, wherein the portable operator control device is adapted for wireless communication with the control unit.

11. A method for securing safety in an industrial robot system comprising at least one industrial robot comprising at least one manipulator located in a robot cell, a control unit for controlling the manipulator, and a portable operator control device for manually operating the manipulator, the method comprising:

detecting when the portable operator control device leaves the robot cell, and producing a warning to the operator upon detecting that the portable operator control device leaves the robot cell, in order to draw the operator's attention to the fact that the portable operator control device is leaving the cell, wherein the portable operator control device comprises safety equipment and the system comprises a safety function, which upon order enables and disables the safety equipment of the portable operator control device.

12. The method according to claim 11, wherein said warning is produced upon detecting that the portable operator control device leaves the cell and the safety equipment is enabled, in order to draw the operator's attention to the fact that the portable operator control device is leaving the robot cell with the safety equipment enabled.

13. The method according to claim 11, wherein the portable operator control device comprises safety equipment and the system comprises a safety function, which upon order enables and disables the safety equipment of the portable operator control device and the method further comprises checking whether or not the safety equipment of the portable operator control device is still enabled a certain time period after the point in time when the portable operator control device has left the robot cell, and on basis thereof order emergency stop of the robot.

14. The method according to claim 11, further comprising:
detecting when the portable operator control device enters the robot cell and the safety equipment is disabled,
checking whether the safety equipment of the portable operator control device is enabled or disabled, and
producing a warning to the operator upon detecting that the portable operator control device enters the robot cell and the safety equipment is disabled, in order to draw the operator's attention to the fact that the portable operator control device is entering the cell with disabled safety equipment.

15. The method according to claim 14, further comprising:
checking whether or not the portable operator control device is still in the robot cell and the safety equipment of the portable operator control device is still disabled a certain time period after the point in time when the portable operator control device entered the robot cell, and on basis thereof order emergency stop of the robot.

16. The method according to claim 11, further comprising:
identifying the portable operator control device upon entering and leaving the robot cell.

17. The method according to claim 16, further comprising:
upon detecting that a portable operator control device is entering the robot cell checking whether or not the portable operator control device is coupled to the control unit of any manipulator located in the robot cell, and emergency stop the robot upon detecting that a portable operator control device, which is not coupled to the control unit of any manipulator located in the robot cell, is entering the cell.

18. The method according to claim 16, further comprising:
registering the portable operator control device upon detecting that the portable operator control device enters the robot cell, and
deregistering the portable operator control device upon detecting that the portable operator control device leaves the robot cell.

19. The method according to claim 11, further comprising:
detecting when someone without a portable operator control device is entering the robot cell, and emergency stop the robot upon detection thereof.

20. The method according to claim 11, wherein said warning is audible, visible or tactile.

21. A computer program product, comprising:
a non-transitory computer readable medium; and
computer program instructions recorded on the computer readable medium and executable by a processor for carrying out a method for securing safety in an industrial robot system comprising at least one industrial robot comprising at least one manipulator located in a robot cell, a control unit for controlling the manipulator, and a portable operator control device for manually operating the manipulator, the method comprising detecting when the portable operator control device leaves the robot cell, and producing a warning to the operator upon detecting that the portable operator control device leaves the robot cell, in order to draw the operator's attention to the fact that the portable operator control device is leaving the cell, wherein the portable operator control device comprises safety equipment and the system comprises a safety function, which upon order enables and disables the safety equipment of the portable operator control device.

22. An industrial robot system, comprising:
at least one industrial robot comprising at least one manipulator located in a robot cell,
a control unit configured to control the at least one manipulator,
a portable operator control device for manually operating the at least one manipulator,
a detecting unit configured to detect when the portable operator control device leaves the robot cell,
a warning generator configured to produce a warning to an operator upon detecting that the portable operator control device leaves the robot cell, in order to draw the operator's attention to the portable operator control device leaving the cell,
an identifying unit configured to identify the portable operator control device upon entering and leaving the robot cell, and
a registration unit configured to register the portable operator control device upon entering the robot cell and deregistering the portable operator control device upon leaving the robot cell.

23. The industrial robot system according to claim 22, further comprising:
means for checking whether or not the portable operator control device is coupled to the control unit of any manipulator located in the robot cell upon detecting that the portable operator control device is entering the robot cell,
wherein the robot system is adapted to emergency stop the robot upon detecting that a portable operator control device, which is not coupled to the control unit of any manipulator located in the robot cell, is entering the cell.

24. An industrial robot system, comprising:
at least one industrial robot comprising at least one manipulator located in a robot cell,
a control unit configured to control the at least one manipulator,
a portable operator control device for manually operating the at least one manipulator,
a detecting unit configured to detect when the portable operator control device leaves the robot cell, and a warning generator configured to produce a warning to an operator upon detecting that the portable operator control device leaves the robot cell, in order to draw the operator's attention to the portable operator control device leaving the cell, wherein the detecting unit is adapted to detect when someone without a portable operator control device is entering the robot cell and the robot system is adapted to emergency stop the robot upon detecting that someone without a portable operator control device is entering the robot cell.

25. A method for securing safety in an industrial robot system comprising at least one industrial robot comprising at least one manipulator located in a robot cell, a control unit for controlling the manipulator, and a portable operator control device for manually operating the manipulator, the method comprising:

detecting when the portable operator control device leaves the robot cell, producing a warning to the operator upon detecting that the portable operator control device leaves the robot cell, in order to draw the operator's attention to the fact that the portable operator control device is leaving the cell, identifying the portable operator control device upon entering and leaving the robot cell, and upon detecting that a portable operator control device is entering the robot cell checking whether or not the portable operator control device is coupled to the control unit of any manipulator located in the robot cell, and emergency stop the robot upon detecting that a portable operator control device, which is not coupled to the control unit of any manipulator located in the robot cell, is entering the cell.

26. The method according to claim 25, further comprising:

registering the portable operator control device upon detecting that the portable operator control device enters the robot cell, and deregistering the portable operator control device upon detecting that the portable operator control device leaves the robot cell.

27. A method for securing safety in an industrial robot system comprising at least one industrial robot comprising at least one manipulator located in a robot cell, a control unit for controlling the manipulator, and a portable operator control device for manually operating the manipulator, the method comprising:

detecting when the portable operator control device leaves the robot cell, producing a warning to the operator upon detecting that the portable operator control device leaves the robot cell, in order to draw the operator's attention to the fact that the portable operator control device is leaving the cell, and detecting when someone without a portable operator control device is entering the robot cell, and emergency stop the robot upon detection thereof.

* * * * *